US006223600B1

(12) United States Patent
Fischer et al.

(10) Patent No.: US 6,223,600 B1
(45) Date of Patent: May 1, 2001

(54) AIR SPRING ARRANGEMENT HAVING A DEVICE FOR MAKING ULTRASONIC DISTANCE MEASUREMENTS THEREIN

(75) Inventors: Norbert Fischer, Sehnde; Roland Altsinger, Burgdorf, both of (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 09/385,425

(22) Filed: Aug. 30, 1999

(30) Foreign Application Priority Data

Aug. 29, 1998 (DE) .............................. 198 39 483

(51) Int. Cl.[7] .......................... B60G 17/04; B60G 17/08
(52) U.S. Cl. .................. 73/629; 267/64.11; 267/64.19; 267/64.27; 267/64.28
(58) Field of Search .................... 73/290 V, 597, 73/627, 629, 862.581, 862.59, 862.621, 862.625; 267/256, 64.11, 64.19, 64.27, 64.28; 280/5.5, 5.514, 5.515, 6.15, 6.157, 6.159, 124.157, 124.158, 124.159; 340/614, 626; 367/902, 908; 356/4.01, 4.08

(56) References Cited

U.S. PATENT DOCUMENTS

| | | | |
|---|---|---|---|
| 3,584,845 | * | 6/1971 | Hoffman .............................. 267/120 |
| 4,798,369 | | 1/1989 | Geno et al. ......................... 267/64.11 |
| 5,859,692 | * | 1/1999 | Ross, Jr. et al. ...................... 356/4.01 |
| 5,936,161 | * | 8/1999 | Fischer .................................... 73/632 |
| 6,032,535 | * | 3/2000 | Fischer et al. ......................... 73/629 |
| 6,073,491 | * | 6/2000 | Fischer et al. ......................... 73/629 |

FOREIGN PATENT DOCUMENTS

| | | | |
|---|---|---|---|
| 3423602 A1 | * | 1/1986 | (DE) ..................................... 73/617 |
| 3620957 | | 1/1987 | (DE) . |
| 197 01 712 C1 | * | 8/1998 | (DE) . |
| 197 01 713 C1 | * | 8/1998 | (DE) . |
| 362055207 | * | 3/1987 | (JP) ................................. 267/64.24 |
| 404266632 | * | 9/1992 | (JP) ................................. 267/64.27 |

* cited by examiner

Primary Examiner—Daniel S. Larkin
Assistant Examiner—Rose M. Miller
(74) Attorney, Agent, or Firm—Walter Ottesen

(57) ABSTRACT

The invention is directed to an air spring arrangement having a device for making ultrasonic distance measurements. An ultrasonic sensor, which is built into an air spring (2) for making measurements, can be disturbed when high frequency sonic oscillations occur when filling and venting the air spring. An air supply line (8) is disposed between the air spring (2) and a source of compressed air (30). To prevent the above disturbing frequencies, the air supply line (8) includes an air connecting pipe stub (10) which is lined with a net-shaped layer (16) on its inner wall surface. The layer (16) is preferably a plastic mesh. The filaments (18) of the mesh-shaped layer (16) are slightly inclined to the longitudinal center axis (28) of the pipe stub (10).

8 Claims, 1 Drawing Sheet

AIR SPRING ARRANGEMENT HAVING A DEVICE FOR MAKING ULTRASONIC DISTANCE MEASUREMENTS THEREIN

FIELD OF THE INVENTION

The invention relates to an air spring having an ultrasonic measuring device for making distance measurements within the air spring.

BACKGROUND OF THE INVENTION

Air springs are mounted between the axle and the chassis as supporting parts in a vehicle. The distance between the chassis and the axle should not change even for different loading conditions. For this reason, it is necessary to measure the air spring height and to readjust the system by pumping and venting air when there are deviations.

Methods for ultrasonic distance measurements are utilized in various areas. Air ultrasonic distance measurements are used, for example, for fill level measurements of vessels, to measure rooms in a building, to measure distance when parking a motor vehicle and to measure distance in autofocusing photo apparatus, et cetera.

Various ultrasonic distance measurement devices have been suggested for determining distances within air springs.

An ultrasonic sensor within an air spring is described for use in a vehicle in German patent publication 3,620,957. In U.S. Pat. No. 4,798,369, an air spring control system is shown which is based on ultrasonic sensors in the form of transducers for measuring spring elevation. The advantages of using ultrasound within an air spring is that no turbulence of the sound waves is possible because of the air stream and that a very good range of the ultrasonic wave is possible even at higher frequencies in the overpressure present in the air spring.

An ultrasonic sensor, which is built into the air spring, for measuring elevation can be disturbed when high frequency sonic oscillations occur when filling and/or venting the air spring. The sonic oscillations are caused because, when the valves are opened, a pressure wave runs into the air spring and flow noises occur at the connecting pieces and these flow noises have a frequency which reaches up to and into the ultrasonic range. A possibility for reducing these disturbances is to reduce the flow velocity, for example, by reducing the cross section of the air line. However, this possibility presents the disadvantage that the lifting and lowering operations take place only very slowly.

SUMMARY OF THE INVENTION

It is an object of the invention to provide an air spring having a device for making ultrasonic measurements wherein the disturbing ultrasonic oscillations, which occur when filling and venting the air spring, are avoided. It is another object of the invention to provide an air connection for such an air spring.

The air spring arrangement of the invention has a device for making ultrasonic distance measurements and includes: an air spring defining an interior space; a source of pressurized air; a connecting assembly for connecting the source to the air spring; the connecting assembly including: a supply line connected to the source; and, a connecting unit for connecting the supply line to the air spring; and, the connecting unit including: a connecting pipe stub having a first end connected to the supply line and a second end opening into the interior space of the air spring; the connecting pipe stub having an interior wall surface; and, a mesh layer lining the interior wall surface.

The solution provided by the invention is realized in an arrangement wherein a spin flow is generated in an air inlet pipe stub of the air spring whereby the velocity in the peripheral region of the air flow is reduced. In this way, the generation of disturbing ultrasonic oscillations is reduced at the tear-away edges without materially deteriorating the air throughflow.

The air connecting stub provided in accordance with a feature of the invention is lined on its inner wall surface preferably with a plastic net or mesh whose filaments are slightly inclined referred to the longitudinal center axis of the pipe stub. In this way, the velocity of the air flow in the peripheral region is reduced and the occurrence of ultrasonic disturbances is diminished.

The flow velocity is already reduced at the transition of the hose to the air connecting stub when the diameter of the stub is greater than that of the air hose. The filaments of the mesh are welded to each other at their crossover points in order that the filaments of the plastic mesh can present a reliable resistance to the intense air flow. A slippage of the plastic mesh out of the air connecting stub is prevented by a holding nose at the air spring end of the air connecting stub.

The end segment of the air connecting stub is formed to have a holding nose. With this holding nose, a possibly occurring acoustic defective adaptation between the stub and the interior space of the air spring can be reliably avoided.

BRIEF DESCRIPTION OF THE DRAWINGS

The invention will now be described with reference to the drawing wherein the single FIGURE (FIG. 1) shows a cutaway view, in section, of the upper portion of an air spring with the stub for the air inflow and air outflow.

DESCRIPTION OF THE PREFERRED EMBODIMENTS OF THE INVENTION

Figure 1:
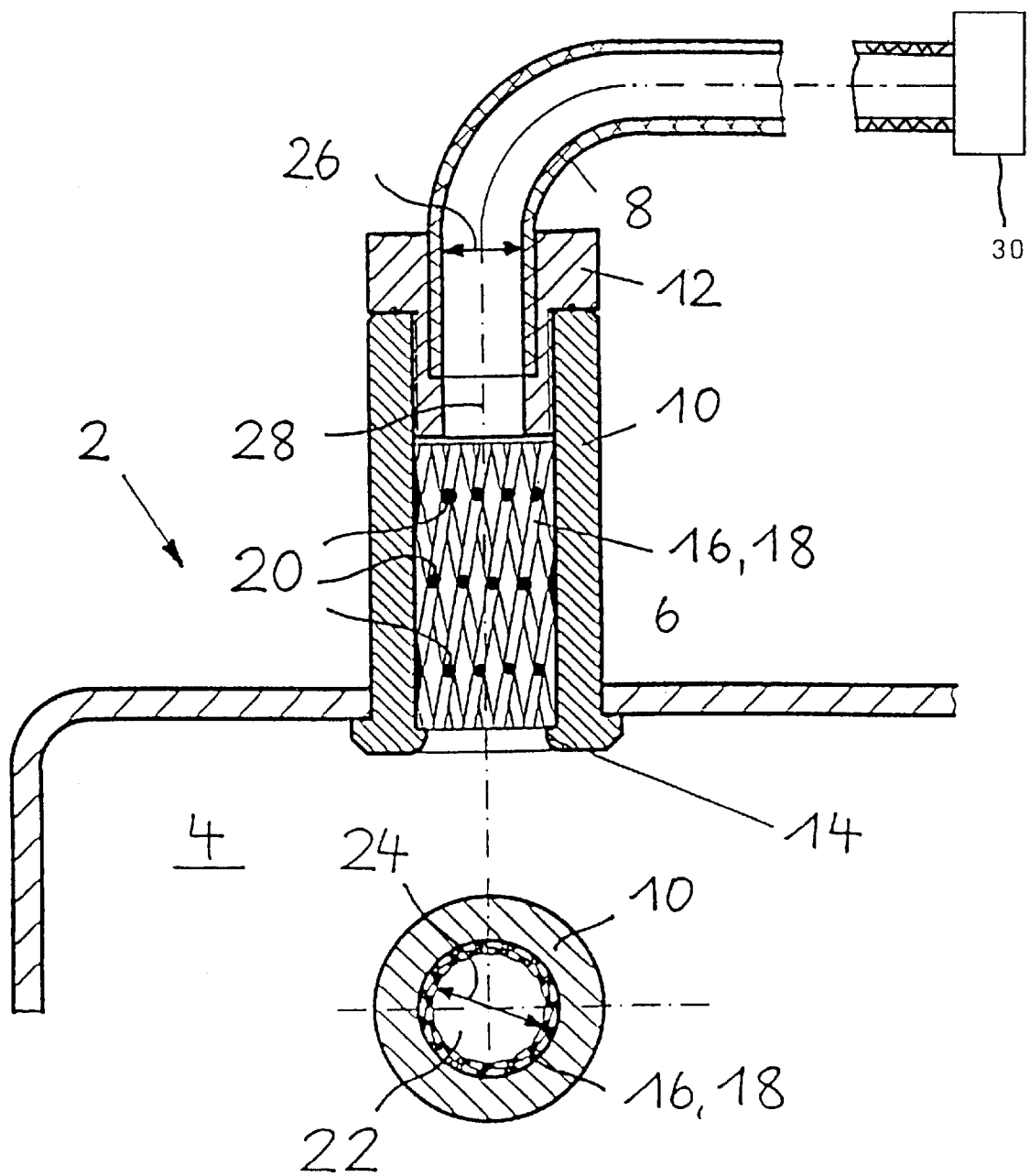

The interior space 4 of the air spring 2 is closed off by a flanged plate 6. This interior space 4 of the air spring 2 is connected to a source of compressed air 30 via a compressed air line configured as a hose 8. To attach the hose 8 to the air spring 2, an air connecting pipe stub 10 is disposed between the end of the hose and the plate 6 and the hose 8 is attached to the stub 10 via a hose connecting piece 12. A holding nose 14 is provided for attaching the air connecting pipe stub 10 to the plate 6. The holding nose 14 prevents a slippage of the air connecting pipe stub 10 out of the plate 6.

The inner wall surface of the air connecting pipe stub 10 is lined with a plastic mesh 16. The filaments 18 of the plastic mesh 16 are melted or welded to each other at their crossover points 20. As shown in the drawing, the interior 22 of the air connecting pipe stub 10 remains clear. The clear diameter 24 of the pipe stub 10 is at least as large as the clear width 26 of the hose 8.

The filaments 18 of the mesh 16 lie on the inner wall surface and run at a steep angle, that is, the filaments define a small angle referred to the longitudinal center axis 28 of the pipe stub. The mesh 16 is held against falling out and being blown away by the holding nose 14 which is also directed inwardly. The holding nose is provided at the edge of the pipe stub 10 facing toward the interior 4 of the air spring. The clear width of the holding nose 14, which is directed inwardly, is greater than the clear diameter 24 of the mesh-lined pipe stub 10. The holding nose 14 is rounded toward the interior space 4 of the air spring.

A spin movement of the air flow occurs because of the inclined filaments 18 of the mesh 16. At the same time, the air flowing close to the wall is slowed. In this way, the flow velocity is reduced at the edge of the pipe stub 10 facing toward the air spring 2 so that only slight ultrasonic noises occur at flow termination.

The air spring can be equipped with a device for making ultrasonic distance measurements as disclosed, for example, in U.S. patent. application Ser. No. 09/307,873, filed May 10, 1999 now U.S. Pat. No. 6,073,491 and incorporated herein by reference.

It is understood that the foregoing description is that of the preferred embodiments of the invention and that various changes and modifications may be made thereto without departing from the spirit and scope of the invention as defined in the appended claims.

What is claimed is:

1. An air spring arrangement having a device for making ultrasonic distance measurements, the air spring arrangement comprising:

an air spring defining an interior space;

a source of pressurized air;

a connecting assembly for connecting said source to said air spring;

said connecting assembly including: a supply line connected to said source; and, a connecting unit for connecting said supply line to said air spring; and, said connecting unit including: a connecting pipe stub having a first end connected to said supply line and a second end opening into said interior space of said air spring; said connecting pipe stub having an interior wall surface; and, a mesh layer lining said interior wall surface.

2. The air spring arrangement of claim 1, said mesh layer being a plastic mesh.

3. The air spring arrangement of claim 2, wherein said connecting pipe stub defines a longitudinal center axis; and, said mesh includes filaments defining a small inclined angle referred to said longitudinal center axis.

4. The air spring arrangement of claim 3, wherein a first plurality of said filaments are inclined in a first direction and a second plurality of said filaments are inclined in a second direction; said first and second pluralities of filaments conjointly defining a plurality of crossover points; and, said first and second pluralities of filaments being welded to each other at said crossover points.

5. The air spring arrangement of claim 1, said supply line having a clear inner diameter; and, said mesh layer defining a clear inner diameter at least as large as said clear inner diameter of said supply line.

6. The air spring arrangement of claim 1, said connecting pipe stub having a holding nose formed on the end thereof for holding said mesh layer in position so that it cannot drop out and be blown away.

7. The air spring arrangement of claim 6, said connecting pipe stub defining a longitudinal center axis; and, wherein said holding nose is rounded in a direction toward said longitudinal center axis.

8. The air spring arrangement of claim 1, wherein said air spring has a plate having an opening formed therein; and, said pipe stub is mounted in said opening of said plate; and, said pipe stub has a flanged edge formed thereon for engaging said plate on the underside thereof facing into said interior space of said air spring.

* * * * *